Oct. 19, 1965     J. S. WHITESIDES     3,212,861
INSULATION OF STRUCTURES
Filed Dec. 4, 1961
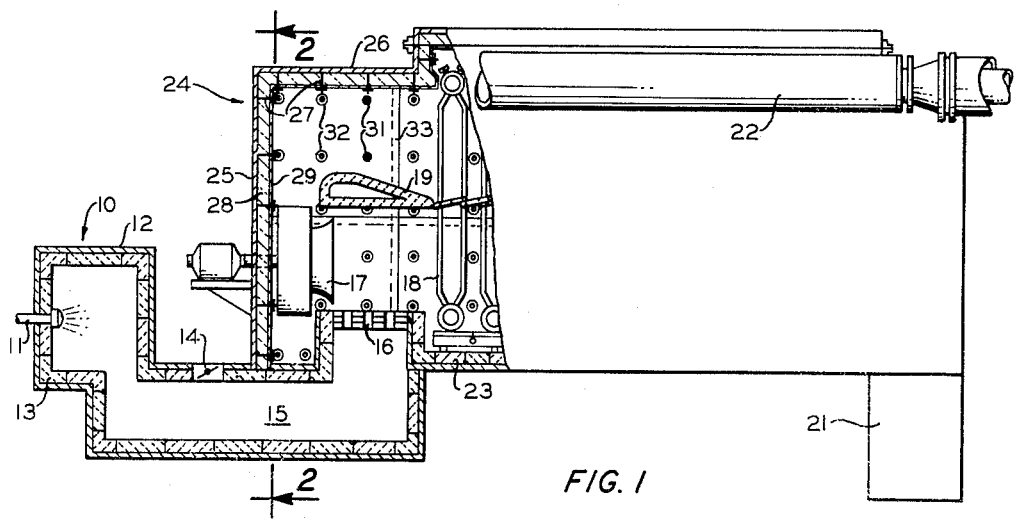
FIG. 1
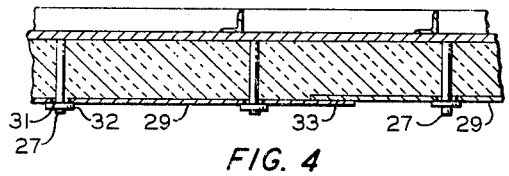
FIG. 4
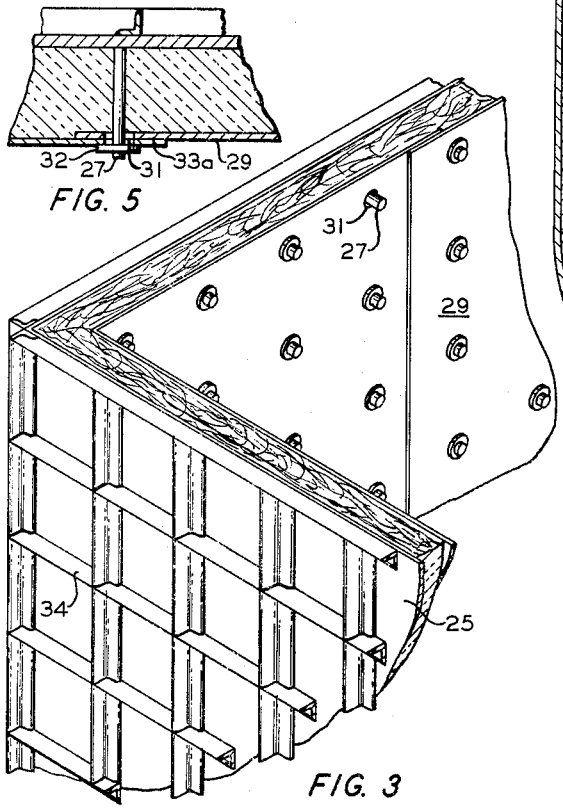
FIG. 5
FIG. 3
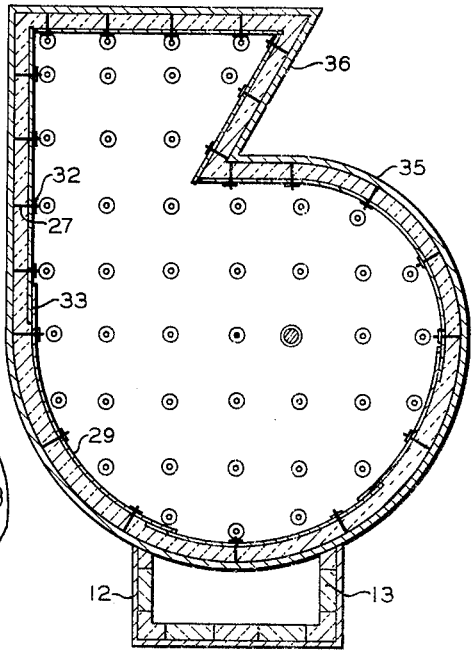
FIG. 2
INVENTOR.
J. S. WHITESIDES
BY *Young and Quigg*
ATTORNEYS United States Patent Office 3,212,861
Patented Oct. 19, 1965

3,212,861
INSULATION OF STRUCTURES
John S. Whitesides, Borger, Tex., assignor to Phillips Petroleum Company, a corporation of Delaware
Filed Dec. 4, 1961, Ser. No. 156,619
2 Claims. (Cl. 23—288)

This invention relates to improvements in the insulation of structures. In one aspect it relates to the insulation of heat exchange and heat retaining structures. In one of its more specific aspects this invention relates to an improvement in the insulation of catalyst cases.

In many catalytic conversion processes rapid and/or extreme temperature changes are encountered at some point in a conversion-regeneration cycle of operation. In catalytic conversion processes it is usually necessary to replace spent catalyst and in processes wherein a solid catalyst is utilized it is often necessary to dismantle the catalyst case in order to recharge the catalyst containers. Such catalyst case is described in U.S. Patent 2,666,692, issued January 19, 1954, to E. Dolezal. Such catalyst cases are employed in the dehydrogenation of n-butane or butene and a solid catalyst is employed which must be replenished at periodic intervals. The catalyst case must be insulated as efficiently as can be done practically in order to supply the proper quantity of heat to the catalyst-containing vessels without an undue expenditure of fuel. Thus the catalyst case is a heat exchanging piece of equipment in which the reactant gases are contained within a catalyst vessel or a plurality of catalyst vessels and combustion gases at very high temperature are forced or drawn over the catalyst containing vessels. The catalyst case must also be a heat retaining piece of equipment in order that the heat from the combustion gases can be forced in the direction of the reactant gases in the catalyst-containing vessels. Thus it is clear that the catalyst case must be very well insulated.

The catalyst case as described in the above patent is made of demountable top and wall sections of carbon steel sheeting and the insulation is applied by laying these sections flat upon the ground and pouring a settable insulation material, in the form of a slurry, into forms positioned upon the sections so that upon setting of the settable insulation material a sheet or cake of insulation formed therein becomes an integral part of the top and wall sections. These sections are then lifted into position with a crane or hoist and are bolted together to form the insulated catalyst case. The floor of the catalyst case is usually constructed of load-bearing refractory material such as firebrick or a poured floor of refractory concrete. The insulation material used on the wall and top sections is usually a refractory insulating cementing material such as Insulcrete or similar mixtures of Portland cement and asbestos fibers. This insulation is very heavy and cracking often occurs in assembling the top and wall sections so that the insulation often must be patched by plastering with a mortar made up of the insulating concrete mixture. Since the layer of insulation must be relatively thick in order to provide adequate insulation of the catalyst case, breakage of the insulation often occurs because of the temperature changes which are necessary in the operation of the catalyst case. The curved sections of the fan case pose a particular problem in the application and it is usually necessary to fabricate a mold in order to apply the insulation to the curved and angular sections of the fan case. The insulation on these irregular surfaces of the fan case is subjected to the vibration generated by the fan as well as to the extreme fluctuations in temperature in the operation of the catalyst case.

It is an object of this invention to provide an improvement in the insulation of catalyst cases wherein an assembly of tubes adapted to contain solid catalyst materials is utilized to accomplish catalytic reactions. It is an object of this invention to provide a light weight insulation for a heat exchange structure or a heat retaining structure which is sufficiently flexible to withstand extreme temperature changes as well as normal handling procedures. A further object of this invention is to provide a light weight insulation which is adaptable to curved surfaces. Still another object of this invention is to provide a method for insulating a structure which can be accomplished simply and economically and with a minimum of auxiliary equipment. Other objects and advantages of this invention will be apparent to one skilled in the art upon studying the disclosure of the invention including the appended drawing wherein:

FIGURE 1 is an elevation, partly in section, of a catalyst case insulated according to the present invention;

FIGURE 2 is a section along line 2—2 of FIGURE 1;

FIGURE 3 is a perspective view of a portion of two adjoining side walls of a catalyst case insulated according to the invention;

FIGURE 4 is a detail of a section of an insulated wall showing one method of lapping the inner panels; and FIGURE 5 is a detail of a section of an insulated wall showing a modification of the method of lapping the inner wall panels.

Referring now to FIGURE 1, a furnace is indicated at 10 comprised of a burner 11, an outer casing 12 and a lining 13 of refractory materials such as firebrick. A controlled amount of air is admitted through port 14 and the combustion gases traverse passageway 15 and pass into the catalyst case through the jetting means 16 located upstream from the fan 17 and downstream from the catalyst tubes 18 so that the hot combustion gases from the furnace 10 and the recycle gases which have passed over the tubes 18 circulate through the fan 17 to the upper portion of the catalyst case which is divided from the lower portion of the catalyst case by the baffling means 19. A controlled portion of the combustion gases is disposed of by means of conduit 21 and an exhaust stack (not shown). Reactant gases are passed through the catalyst tubes 18 by means including appropriate headers indicated at 22 as described in U.S. Patent 2,666,692.

The walls of furnace 10 and the floor 23 of the catalyst case 24 are fabricated from solid refractory material according to the practice of the prior art, the floor section of the catalyst case being constructed of load-bearing solid refractory material. The wall sections of the catalyst case 24 comprise the outer steel wall sections 25 and the steel top section 26. These sections have welded to their inner surfaces at regularly spaced intervals stainless steel rods indicated at 27. A blanket of fibrous insulating material 28 is placed against the wall sections 25 so as to be supported by the rods 27 and a plurality of stainless steel panels 29 having therethrough perforations indicated at 31 spaced so as to coincide with the rods 27 and having diameters greater than those of the rods 27 are placed against the insulating blanket so as to be supported also by the rods 27. The panels 29 are secured in position by stainless steel washers, indicated at 32, welded to the stainless steel rods 27. The panels 29 are lapped as indicated at 33.

FIGURE 2 illustrates a method for forming the insulation on curved surfaces 35 and angular surfaces 36.

FIGURE 3 shows, in somewhat greater detail, the method of applying the insulation of the invention and a method for adding structural strength to the wall sections by means of the braces 34 attached to the shell or wall sections 25. The perforations 31 in the panels 29 are larger than the pins 27, as shown, to provide for contraction and expansion of the panels 29.

The panels 29 can be lapped between the pins 27, as shown at 33 in FIGURE 4, or the laps can be made at the pins, as shown at 33a in FIGURE 5. The washers 32 are selected so as to be larger than the perforations 31 in the panels 29.

The insulation method of this invention makes possible the construction of catalyst cases having extremely light weight sides, top and back sections, and fan housings capable of being easily removed during catalyst changes or for other necessary functions, and replaced with no repairs or patching of the insulation being required. The approximate weight of the prior art cast insulation is about 65 to 75 pounds per square foot whereas the weight of the insulation of the invention is about 8 to 10 pounds per square foot. Thus a 10 x 10 foot section insulated by the casting procedure of the prior art would weigh 650 to 750 pounds and it is clear that lifting equipment such as a crane or hoist would be required, whereas a 10 x 10 foot section insulated in accordance with the present invention will weigh 80 to 100 pounds and can easily be handled without auxiliary equipment.

The mineral wool blanket insulation has been proven equal to, or better than, castable insulation so that adequate insulation can often be obtained with a thinner overall wall thickness than is possible with the insulation methods of the prior art. The unique feature of impaling the insulation upon the stainless steel rods projecting from the catalyst case wall and securing the stainless steel inner panels by stainless steel washers spot welded to the rods allows for thermal expansion of the elements without imposing stresses upon the elements. The feature of lapping the inner wall sections with no permanent connections also facilitates construction and provides freedom for expansion. The inner panels should be lapped about 3 inches and the rods should extend about 1 inch through the inner panels to facilitate spot welding the washers to the rods. The washers should be spot welded to the rods only sufficiently securely to insure the retention of the panels to facilitate removal of the panels if such is desired or necessary to add or change insulation.

The insulation can be any type of mineral wool blanket type insulation such as rock wool, glass wool (high silica content glass), asbestos fibers, and the like.

The panels for the inner wall can be made from 14 gage (0.064 inch) or 16 gage (0.051 inch) sheets of stainless steel such as type 304 or 316 or other material which will withstand temperatures from ambient air temperatures to about 1200° F. The rods and washers can be made from similar stainless steel. The perforations in the panels can be formed to coincide with the pins by spacing the pins on 10, 16 or 18 inch centers and making the perforations in the panels on corresponding centers. Since the perforations are larger than the pins there can be considerable latitude in the measurements. If the pins or rods are ¼-inch diameter, the perforations should be at least about ½-inch diameter.

Another method for locating the sites for the perforations in the panels is to lay the panels against the rods or pins and peen the panel sufficiently to mark the panel at the rods. Still another method for locating the sites for the perforations is to paint the ends of the rods and to lay the panels against the rods while the paint is wet.

Although the invention has been described with respect to the insulation of a catalyst case for dehydrogenation of butane and butene, it will be apparent to those skilled in the art that the insulation can be employed for other services, for example the insulation of Dutch ovens, freight cars, refrigerated or heated storage bins, and the like. In general, the invention is applicable wherever it is desirable to install light weight insulation.

Variations and modifications are also possible within the scope of the disclosure without departing from the spirit and scope of the invention.

That which is claimed is:
1. An insulated housing for a catalyst case wherein butane and butenes are catalytically dehydrogenated which consists essentially of a carbon steel shell; a plurality of ¼-inch diameter stainless steel rods welded to the inner surface of said shell on 10 to 18 inch centers and normal to the surface of the shell; a mineral wool blanket 4 to 6 inches thick positioned adjacent the inner surface of said shell and pierced by said rods; stainless steel sheets 14 to 16 gage having perforations coinciding with said rods and larger in diameter than that of the rods to allow thermal expansion and contraction of said sheets without imposing stresses on said sheets, said perforations being positioned adjacent the mineral wool blanket and pierced by said rods; and a stainless steel washer welded to each rod adjacent said sheet on the side opposite said blanket.

2. An insulated housing comprising wall sections wherein each section consists essentially of an outer wall of said housing; a plurality of rods secured to the inner surface of each of said sections in spaced relation and normal to the inner surface of the wall; a layer of fibrous insulation covering the inner surface of the wall and pierced by said rods; a plurality of adjacent and overlapping solid sheets of heat resistant material having perforations of larger diameter than that of said rods so as to allow thermal expansion and contraction of said sheets without imposing stresses upon said sheets, said perforations coinciding with said rods covering said insulation and pierced by said rods; and means to retain said rods in said perforations.

References Cited by the Examiner
UNITED STATES PATENTS

| | | | |
|---|---|---|---|
| 1,376,440 | 5/21 | Ives | 266—43 |
| 2,295,103 | 9/42 | Friedly. | |
| 2,666,692 | 1/54 | Dolezal et al. | 23—288.92 |
| 2,683,654 | 7/54 | Bergman | 23—288 |
| 2,731,374 | 1/56 | De Reus | 154—44 |
| 2,738,094 | 3/56 | Fowler | 154—44 X |
| 2,833,631 | 5/58 | Rossheim et al. | 23—288 |
| 3,041,149 | 6/62 | Houdry | 23—288.3 |

OTHER REFERENCES

Fiberglas Standards, Owens-Corning Fiberglas Corp. Catalog, IN6.A1, section on Duct Insulations, pages 4–5 (August 1949), TS 1549G509.

O.C.F. Catalog, D9.4.1, section on Marine and Naval Market, page 2 (June 1, 1944).

MORRIS O. WOLK, *Primary Examiner.*

GEORGE D. MITCHELL, *Examiner.*